United States Patent
Hackenschmied et al.

(10) Patent No.: US 9,113,542 B2
(45) Date of Patent: Aug. 18, 2015

(54) METHOD FOR TEMPERATURE STABILIZATION, X-RAY DETECTOR AND CT SYSTEM

(71) Applicant: SIEMENS AKTIENGESELLSCHAFT, Munich (DE)

(72) Inventors: Peter Hackenschmied, Nuremberg (DE); Christian Schröter, Bamberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 98 days.

(21) Appl. No.: 13/949,378

(22) Filed: Jul. 24, 2013

(65) Prior Publication Data

US 2014/0037066 A1    Feb. 6, 2014

(30) Foreign Application Priority Data

Jul. 31, 2012   (DE) .................. 10 2012 213 404

(51) Int. Cl.
*H05G 1/30* (2006.01)
*G01T 1/24* (2006.01)

(52) U.S. Cl.
CPC . *H05G 1/30* (2013.01); *G01T 1/244* (2013.01)

(58) Field of Classification Search
CPC ........ A61B 6/032; A61B 6/035; A61B 6/585; G01T 1/24; H05G 1/26; H05G 1/265
USPC ............................................ 378/19, 91, 207
See application file for complete search history.

(56) References Cited

U.S. PATENT DOCUMENTS

| 7,006,599 B2 * | 2/2006 | Okamura et al. .......... 378/98.11 |
| 2007/0158575 A1 | 7/2007 | Heismann et al. |
| 2011/0253886 A1 | 10/2011 | Hackenschmied et al. |

FOREIGN PATENT DOCUMENTS

| DE | 102005061358 A1 | 7/2007 |
| DE | 102010015422 A1 | 10/2011 |

* cited by examiner

*Primary Examiner* — Jurie Yun
(74) *Attorney, Agent, or Firm* — Harness, Dickey & Pierce, P.L.C.

(57) ABSTRACT

A method is disclosed for the temperature stabilization of a direct-converting X-ray detector, including a detector surface having a semiconductor and being divided into a plurality of partial detector surfaces. During the irradiation of the detector surface, heat is generated in the semiconductor by electric power. Electric power generated in the semiconductor is kept constant for each partial detector surface at least during a heterogeneous and/or temporally variable irradiation of the detector surface by feeding-in power-adjusted additional radiation for each partial detector surface. A direct-converting X-ray detector is disclosed for the detection of X-rays. At least one control loop with at least one reference variable is embodied for the energy regulation of the additional radiation, which keeps the temperature in the semiconductor constant for each partial detector surface by keeping the electric power in the semiconductor constant by changing the energy of the additional radiation. A CT system is disclosed.

27 Claims, 2 Drawing Sheets

US 9,113,542 B2

METHOD FOR TEMPERATURE STABILIZATION, X-RAY DETECTOR AND CT SYSTEM

PRIORITY STATEMENT

The present application hereby claims priority under 35 U.S.C. §119 to German patent application number DE 102012213404.2 filed Jul. 31, 2012, the entire contents of which are hereby incorporated herein by reference.

FIELD

At least one embodiment of the invention generally relates to a method for the temperature stabilization of a direct-converting X-ray detector, comprising a detector surface having a semiconductor material and being divided into a plurality of partial detector surfaces, wherein, during the irradiation of the detector surface, heat is generated in the semiconductor material by electric power, and at least one additional radiation source for each partial detector surface, which irradiates the semiconductor with additional radiation.

At least one embodiment of the invention also generally relates to a direct-converting X-ray detector for the detection of X-rays, comprising at least one detector surface for the detection of X-rays having a semiconductor material and being divided into a plurality of partial detector surfaces, wherein, during the irradiation of the detector surface, heat is generated in the semiconductor material by electric power, and at least one additional radiation source for each partial detector surface, which irradiates the semiconductor material with additional radiation, and a CT system with an X-ray detector.

BACKGROUND

Detectors used, or attempted to be used, for the detection of gamma and X-rays, in particular in CT, SPECT and PET systems, include inter alia direct-converting detectors based on semi-conductive materials, such as CdTe, CdZnTe, CdZnTeSe, CdTeSe, CdMnTe, InP, TlBr2, HgI2. Monocrystals or polycrystals in these materials have numerous crystal defects, for example lattice defects, impurity atoms and/or deliberately introduced dopants. These crystal defects generate inter alia fixed, electronic states with bonding energy lying between the energies of the valence and conduction band of the semiconductor. Here, a differentiation is made between flat impurities, which are energetically close, that is less than 30 meV, to the valence or conduction band, and deep impurities, with an energetic spacing to the bands of greater than 30 meV. Flat impurities are already fully ionized at room temperature. This means that their occupation probability does not change as the temperature increases, in particular during the operation of a CT device. However, at room temperature, the deep impurities are only partially ionized so that their occupation probability is heavily temperature-dependent. This applies to semiconductor detectors both with and without additional charge-carrier generation by additional irradiation.

The changing occupation probability of the deep impurities in the event of temperature fluctuations causes a change in the electric field in the interior of the semiconductor and hence also results in a change in the electric power. This also causes a change in the pulse shapes of the pulses triggered by the X-rays and, in the case of firmly fixed electronic thresholds for the pulse-height discriminators of the detector, there is also a change in the counting rates in the case of a constant X-ray flux. This results in the following problems: on the one hand, due to the photocurrent generated, the inserted X-ray flux results in the heating of the semiconductor and a drift in the counting rate. The associated energy loss P of the detector is determined by the high voltage U applied and the photocurrent I using the equation $P=U*I$. On the other hand, calibration tables, which were generated under specific temperature and flow conditions, lose their validity as soon as the temperature of the semiconductor changes. Both effects result in unacceptable artifacts in the imaging.

Hitherto, it is known how to regulate, i.e. stabilize, the temperature in the semiconductor material by means of control elements, for example Peltier elements, which are attached under the unit comprising semiconductor and evaluation electronics, the ASIC (=Application Specific Integrated Circuit). However, this has the following drawbacks: the temperature regulation is inert. Temperature fluctuations, caused by a rapidly changing X-ray flux cannot, therefore, be compensated. However, in a CT system and also in other imaging methods, typically above all rapid changes to the X-ray flux occur. Moreover, with the known temperature regulation, the heat or the temperature change is generated, not in the interior of the semiconductor, but outside the semiconductor, that is on its surface. This inevitably results in a non-uniform temperature profile in the semiconductor since, for example, the surface is exposed to a cooling air flow. Therefore, on the insertion of an X-ray flux, the temperatures in the semiconductor can change even if the average temperature remains constant. This also causes a change in the electric field in the semiconductor and hence a counting rate drift.

SUMMARY

At least one embodiment of the invention is directed to a method for the stabilization of the temperature in a direct-converting X-ray detector. At least one embodiment of the invention is directed to a direct-converting X-ray detector and/or a CT system.

Advantageous developments of the invention are the subject matter of subordinate claims.

The inventors have identified that the temperature of a semiconductor can be stabilized in that the electric power in the semiconductor material is kept constant by varying, power-adjusted additional irradiation of the semiconductor during the X-ray irradiation. It is therefore possible to achieve a constant temperature via a constant electric power, wherein changes to the electric power are compensated by adjusting the additional irradiation.

Hence, the subject matter of at least one embodiment of the invention is a direct-converting X-ray and gamma radiation detector with a direct-converting semiconductor, for example CdTe, CdZnTe, CdZnTeSe, CdTeSe, CdMnTe, InP, TlBr2, HgI2, a radiation source for the generation of additional charge carriers and a control loop for the power-dependent regulation of the additional irradiation of the semiconductor. The mode of operation of at least one embodiment of the invention resides in the thermal stabilization of the detector by way of a photocurrent generated by the additional radiation source and the associated electric power loss.

The drifting charge carriers, that is electrons and/or holes can be applied by electromagnetic radiation, for example IR, UV or visible radiation or in principle also electron bombardment, in the semiconductor material. The additional radiation can be irradiated onto the semiconductor in a pulsed or permanent manner during or before the X-ray irradiation, for example in a defined temporal interval. Here, the charge carriers are generated close to the surface, in particular at the cathode of the detector, and due to an electric voltage applied to the semiconductor, drift into the interior of the semiconductor.

Here, the semiconductor can be irradiated from the side, via semitransparent contacts or through the gaps in the detector's electrode mask, from where the diffusion of the charge carriers into the semiconductor starts. The choice of the wavelength of the additional radiation is determined by the band gap of the semiconductor used. On the one hand, the energy of the radiation used should permit band-to-band transitions of the charge carriers so that this requires a radiation energy above the band-edge energy. For example, CdTe has a band gap of 1.4 eV. This corresponds to a wavelength of about 850 nm, i.e. near infrared. Radiation with a shorter wavelength has higher energy, for example visible light and can therefore be used in principle. However, on the other hand, the penetration depth of electromagnetic radiation falls with a decreasing wavelength, i.e. increasing energy. The absorption of the radiation then increasingly takes place in a possibly contaminated surface layer of the semiconductor, which can render the charge-carrier generation inefficient. Hence, additional radiation with an energy greater than, but close to, the band edge of the semiconductor is particularly suitable.

In addition, the additional radiation can also be generated directly in the evaluation electronics and, for example, via a correspondingly transparent underfill, coupled into the detector. To this end, the additional radiation source can be grown on, deposited on or mechanically connected to the evaluation electronics. Here, light-emitting diodes are used, for example. These radiation sources can be attached beneath each pixel interspace or at the edge of the evaluation electronics. In particular in the case of a detector in a CT system, the radiation source can also be attached on a side extending in the z-direction or system axis direction.

When the semiconductor is irradiated, the charge carriers are formed, which, on the application of voltage, move as a photocurrent through the semiconductor and consume electric power. This results in intentional heating of the semiconductor or the generation of a photocurrent with which a variation in incident X-rays and the resultant change to the electric power induced in the semiconductor can be compensated.

One condition for the generation of the photocurrent is that an electric field be applied to the semiconductor to effect the drift of the charge carriers since otherwise no power loss occurs in the detector. In order to achieve timely temperature stabilization at a prespecified level, the additional irradiation and the application of high voltage should take place before the measuring process. The lead time used for this is dependent upon the detector and the environment and is generally within a range of a few minutes.

The regulation of the additional radiation sources for the temperature stabilization can be performed in various ways. In one variant, the surface temperature of the semiconductor is measured. For this, the temperature measurement is performed, for example, contactlessly by way of IR diodes, thermocouples or the like. Temperature measurement on the evaluation electronics is also possible. The reference variable of the radiation sources is the temperature of the semiconductor. In the case of a low measured temperature, the power of the additional radiation is increased. On the other hand, in the case of a higher measured temperature, the power of the additional radiation is reduced.

In another variant, the regulation of the additional radiation sources is dependent on the X-ray flux. In this case, a light output of the additional radiation is set that corresponds to the maximum expected X-ray flux, i.e. the same energy flux (=energy input per time and area). Here, the detected X-ray flux is the reference variable. The higher the detected X-ray flux, the lower the power irradiated from the additional radiation sources. The objective is to keep the total of the light or energy fluxes from the additional radiation source and the X-ray flux to be measured constant.

As a further variant for the temperature stabilization, it is possible to measure the photocurrent in the semiconductor, that is the total of the photocurrents generated by X-rays or by the additional radiation source. Here, the regulation of the additional radiation source is performed such that the total photocurrent is kept constant.

The temperature measurement and the current measurement are particularly suitable for keeping the electric power loss or the temperature constant. In the first case, the regulation is performed directly on the target variable and hence the aforementioned recharging effects are avoided. However, since the temperature is the result of the available cooling capacity and the power loss, this is also kept constant when the power loss is constant, since the cooling capacity typically remains unchanged. On the other hand, in the case of an X-ray flux measurement, due to the different nature of the radiation, it cannot necessarily be assumed that the photocurrent is constant. Accordingly, it is possible that the temperature constancy will also not be retained in such an optimal manner. However, one advantage of an X-ray flux is the fact that no additional parameter, such as the temperature or the current has to be detected. The information on the intensity on the incident X-rays is anyway detected by the detector.

The power of the additional radiation can, for example, be varied by means of a change in the intensity, the pulse duration and/or the pulse spacing during the irradiation.

The generation of the heat in the semiconductor takes place intrinsically, that is in the interior of the material. This causes the heat profile, that is the temperature distribution within the material to correspond to the heat profile of the X-ray irradiation on additional irradiation. The additional radiation sources can be regulated very quickly. Hence, it is also possible to quickly compensate any flux fluctuations that occur during a measurement in the detector. Smaller fluctuations, which are due to the finite reference variables, and hence lie within the millisecond range, are of no consequence due to the thermal inertia of the detector. With the method according to the invention and the structure of the detector suggested therefor, it is possible to dispense with Peltier elements as thermoregulators. This greatly simplifies the detector structure. The overall heat balance is much more favorable since the considerable waste heat generated by the Peltier elements does not occur. This also simplifies the cooling concept for the detector.

Accordingly, the inventors suggest that a method for the temperature stabilization of a direct-converting X-ray detector, in particular for use in a CT system, comprising a detector surface having a semiconductor being divided into a plurality of partial detector surfaces, wherein, during the irradiation of the detector surface, heat is generated in the semiconductor by electric power should be improved in that electric power generated in the semiconductor for each partial detector surface is kept constant at least during a heterogeneous and/or temporally variable irradiation of the detector surface by feeding-in power-adjusted, additional radiation for each partial detector surface.

With the method according to at least one embodiment of the invention, the temperature can be stabilized or kept constant in that the temperature-dependent electric power loss in the semiconductor is kept constant. Hence, the counting rate drift of the X-ray detector can be avoided. These methods are performed for each partial detector surface. The irradiation of the detector surface, to be more precise, the X-ray irradiation, can, considered spatially over the entire detector surface, change so that partial detector surfaces are irradiated differently at the same time. The irradiation can also change with time.

In order to keep the electric power constant during the changing irradiation of the detector surface constant, according to at least one embodiment of the invention, the additional irradiation for each partial detector surface is varied or adjusted as a function of changes to the electric power. In other words, in the case of changing electric power in the semiconductor for each partial detector surface, the power of the additional radiation is adjusted for each partial detector surface. Hence, a power-adjusted change to the additional irradiation takes place. Advantageously, in the case of a drop in the electric power, the additional irradiation is increased.

On the other hand, in the case of an increase in the electric power, advantageously, the additional irradiation is reduced. The change in the power of the additional irradiation causes more or fewer additional charge carriers to be generated in the semiconductor, which in turn change the electric field in the interior of the semiconductor. Preferably, at least during the temperature stabilization of the X-ray detector, a voltage is applied to the semiconductor to enable the movement of the charge carriers in the semiconductor material. The additional currents can, compared to X-ray-generated pulses, be approximated as constant currents. Therefore, the time constants used for the pulsed additional radiation (pulse width ~100 ns) are about 100 times larger than the time constants of the X-rays to be measured (pulse width ~100 µs). Hence, the pulses of the additional radiation do not make any contribution to the actual measurements of the counting X-ray detector.

The power adjustment of the additional radiation is advantageously performed as a function of different parameters of the X-ray detector. In one embodiment, a temperature of the partial detector surface is determined and with reference to the measured temperature the power of the additional radiation is adjusted or changed. Here, advantageously, the surface temperature of the semiconductor for each partial detector surface is measured by way of contactless temperature measurement, for example by IR diodes, thermocouples or the like.

In another embodiment, the temperature measurement is performed on the evaluation electronics of the detector. However, this entails not a direct measurement of the temperature of the semiconductor, but a measurement of the temperature of the evaluation electronics which are thermally connected to the detector via the metallic soldered connection so that this temperature measurement can be faulty and imprecise. According to the power-adjusted change to the additional irradiation, in the case of a low measured temperature, the power of the additional radiation is preferably increased. Vice versa, in the case of a high measured, temperature, the power of the additional radiation is preferably reduced. In practice, with the above-described method, the detector is stabilized at temperatures in the range of about 30° C. to 50° C.

In another embodiment, for each partial detector surface, an X-ray flux is measured as a function of which the energy adjustment of the additional irradiation is performed. To this end, advantageously, the X-ray flux is derived from detector measured values of the X-ray detector itself. For purposes of simplicity, it is hence possible to dispense with an additional metering unit. For the temperature stabilization, the power of the additional radiation is set such that the sum of the two energy flows corresponds to the maximum X-ray flux expected, that is to an equal photocurrent. Here, precise values are preferably determined experimentally. The higher the detected X-ray flux, the less power is irradiated by the additional radiation sources and vice versa. The advantage of this measuring method is that no additional parameter is generated and measured, instead a measurement of the X-ray flux is performed in the context of the measuring method in the detector itself.

A further embodiment envisages that the energy adjustment of the additional radiation is performed as a function of a total measured current in the semiconductor for each partial detector surface. The current in the semiconductor is generated both by the X-rays and by the additional radiation. The power of the additional radiation is in each case changed such that the current in the semiconductor remains constant.

Advantageously, the temperature measurement and the current measurement are suitable for determining a power-adjusted change in the additional radiation.

The power of the additional irradiation can be changed in different ways and hence be adjusted to match the measured parameters such as temperature, X-ray flux and/or current. In one embodiment, the intensity of the additional radiation is changed. In another embodiment, a pulse duration and/or a pulse spacing of the additional irradiation is changed. An increased intensity or an extended pulse duration or a reduced pulse spacing advantageously causes an increase in the power. Changes to the parameters of the additional radiation can be combined with each other as desired in order to achieve a desired change in the power of the radiation.

Advantageously, additional irradiation used is electromagnetic radiation, for example IR, UV or visible radiation. In principle, it is also possible to use electron radiation. The additional radiation can be irradiated from the side, via semitransparent contacts or via gaps in the electrode mask of the detector into the semiconductor. It is also possible to irradiate the additional radiation into the semiconductor by the evaluation electronics. The semiconductor can also be irradiated by a cathode or anode.

Advantageously, the irradiation of the semiconductor with the additional radiation is performed before the use of the X-ray detector for the measurement, for example in a prespecified time interval from the measurement and/or over a prespecified period. Also advantageously, the voltage is also applied to the semiconductor before the use of the X-ray detector for the measurement.

In the case of a power-adjusted change to the irradiation, a partial detector surface is used in each case. Here, the partial detector surfaces used are embodied differently. The smaller the partial detector surface, the more precisely changes to the local electric power of the detector can be compensated since a more precise-spatially resolved change to the irradiation is possible. In one embodiment, here, predefined groups of detector elements are used as a partial detector surface. These groups are for example of different sizes. In another embodiment, a detector element, that is a pixel, is used as a partial detector surface. Yet another embodiment envisages that a detector module is used as a partial detector surface. In a further embodiment, the entire detector surface is used as a partial detector surface.

The inventors also suggest that a direct-converting X-ray detector for the detection of X-rays in accordance with the method according to at least one embodiment of the invention described above, in particular for use in a CT system, comprising at least one detector surface used for the detection of X-rays having a semiconductor and being divided into a plurality of partial detector surfaces, wherein during the irradiation of the detector surface, heat is generated in the semiconductor by electric power, and for each partial detector surface at least one additional radiation source, which irradiates the semiconductor with additional radiation can be improved in that at least one control loop with at least one reference variable is embodied for energy regulation of the additional radiation, which for each partial detector surface, keeps the temperature in the semiconductor constant by keeping the electric power in the semiconductor constant by means of a change to the power of the additional radiation.

The X-ray detector comprises the detector surface used for the detection of the X-rays. The detector surface comprises a semiconductor for the direct-converting detection of the X-rays. The detector surface is also divided into a plurality of partial detector surfaces. Here, the division of the detector surface can be performed in different ways; in particular, the partial detector surfaces are then embodied differently. The partial detector surface is, for example, embodied as pre-defined groups of detector elements, as a detector element or pixel or as a detector module. In one embodiment, the partial detector surface corresponds to the entire detector surface.

In the case of X-ray irradiation of the detector surface, heat is generated in the semiconductor by electric power. For each partial detector surface, the X-ray detector comprises at least one additional radiation source, which irradiates the semiconductor with additional radiation. Preferably, precisely one additional radiation source is embodied for each partial detector surface. In one embodiment, the additional radiation source is embodied as a light-emitting diode for the emission of electromagnetic radiation. Another embodiment envisages that the additional radiation source is embodied as an electron source. The radiation source is, for example, arranged on one side of the semiconductor or at the cathode or anode side.

According to at least one embodiment of the invention, the X-ray detector comprises at least one control loop with at least one reference variable. One embodiment has precisely one control loop, other embodiments envisage a plurality of control loops. The control loop can, for example, be integrated directly in the X-ray detector or embodied as a separate unit, which is controlled via an external computing software. Preferably, a plurality of different reference variables is provided. For example, each control loop comprises another reference variable or a plurality of reference variables. The control loop is used for the energy regulation of the additional radiation. Here, changing the power of the additional radiation keeps the electric power in the semiconductor constant for each partial detector surface, which in turn effects the stabilization or a constancy of the temperature in the semiconductor.

The power-adjusted change of the additional irradiation can be regulated with reference to a plurality of different reference variables, wherein the reference variables are determined in different ways. In one embodiment of the X-ray detector, the at least one control loop comprises at least one temperature metering unit for measuring the temperature of the semiconductor for each partial detector surface. Here, the measured temperature of the semiconductor for each partial detector surface serves as a reference variable of the control loop. The change in the power of the additional radiation then takes place as a function of the measured temperature or the changes thereto. The temperature metering unit used is, for example, an IR diode, which measures a surface temperature of the semiconductor in a contactless way. In another embodiment, the temperature metering unit comprises a thermocouple or another type of thermometer. A further embodiment envisages that the temperature is measured indirectly via the evaluation electronics of the detector.

In another embodiment, the X-ray flux of the detector is used as a reference variable. To this end, the at least one control loop preferably comprises for each partial detector surface a connection to a metering unit of the X-ray detector, wherein the X-ray flux measured in the respective partial detector surface is used as a reference variable. The power of the additional radiation is regulated as a function of flux.

In yet another embodiment of the X-ray detector, for each partial detector surface, the at least one control loop comprises at least one current-metering unit for measuring current generated in the semiconductor. Here, the measured current serves as a reference variable on the adjustment of the additional radiation. The measured current comprises the entire current generated in the semiconductor by the X-rays and the additional radiation.

At least one embodiment of the invention also relates to a CT system, at least comprising a direct-converting X-ray detector according to at least one embodiment of the invention as described above, with which tomographic images of an object under examination can be created, wherein, at least during the measurement, the temperature of the X-ray detector is stabilized by way of the above-described method according to at least one embodiment of the invention. In the case of a CT system with the X-ray detector according to at least one embodiment of the invention, advantageously a drift-free measurement of the radiation absorption is ensured so that the images created are advantageously free of image artifacts.

BRIEF DESCRIPTION OF THE DRAWINGS

In the following, the invention will be described with reference to the preferred example embodiments with reference to the figures, wherein only the features necessary to understand the invention are described. The following reference characters are used: 1: Semiconductor; 2: Electrode; 3: Additional radiation source; 4: Detector metering unit; 5: Temperature metering unit; 6: Electric connection; 7: Current-metering unit; C1: CT system; C2: First X-ray tube; C3: First detector; C4: Second X-ray tube (optional); C5: Second detector (optional); C6: Gantry housing; C7: Patient; C8: Patient couch; C9: System axis; C10: Computing and control unit; I: Current generated in the semiconductor; Prg1 to Prgn: Computer programs; U: Voltage applied to the semiconductor.

The figures show in detail.

DETAILED DESCRIPTION OF THE EXAMPLE EMBODIMENTS

Figure 1:
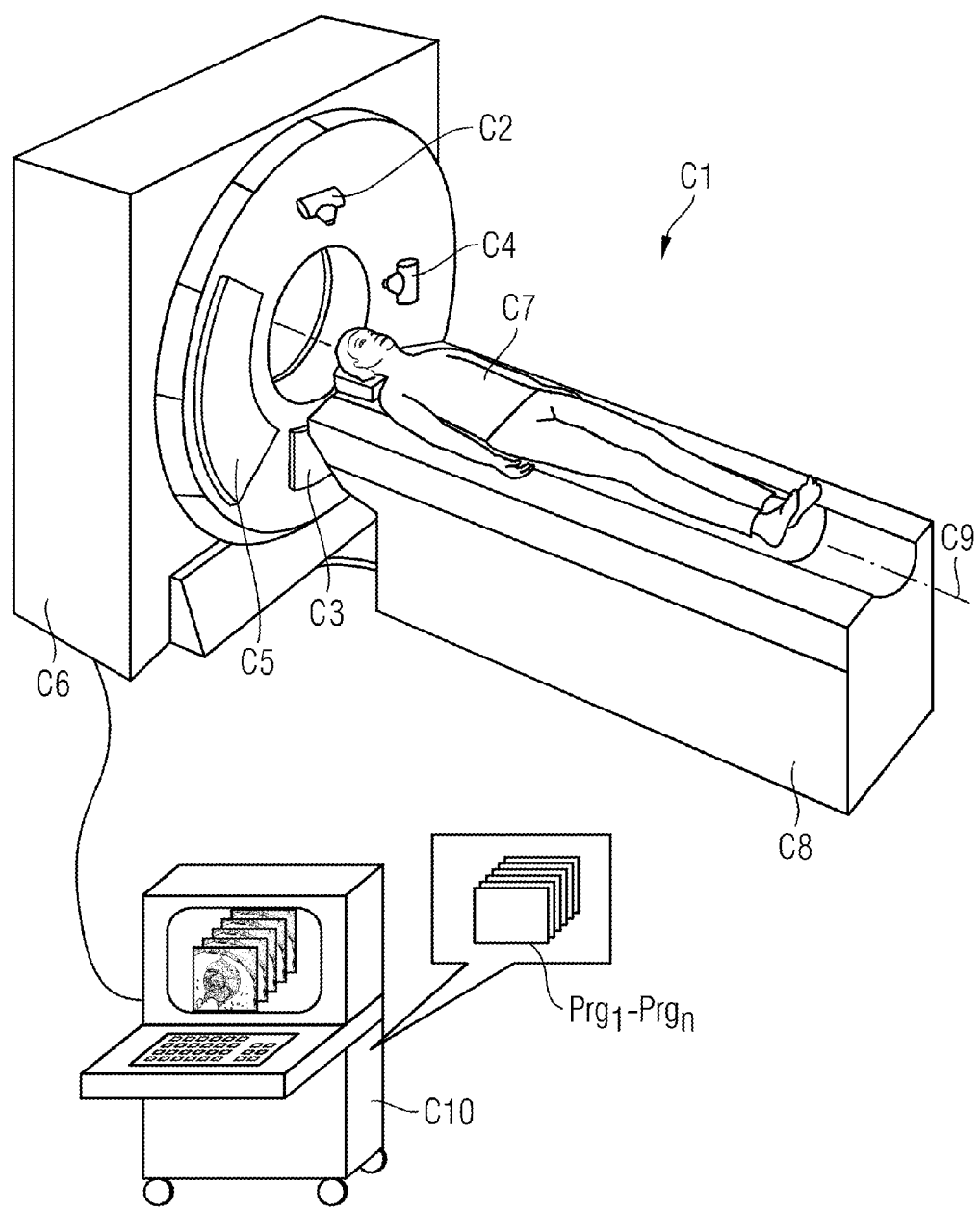
FIG. 1 a schematic representation of a CT system with a computing unit.

The present invention will be further described in detail in conjunction with the accompanying drawings and embodiments. It should be understood that the particular embodiments described herein are only used to illustrate the present invention but not to limit the present invention.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows an example embodiment of a CT system C1. The CT system C1 comprises a gantry housing C6, in which a gantry, not shown in further detail here, is located, to which a first X-ray tube C2 is attached with an opposite first detector C3. Optionally, a second X-ray tube C4 with a second opposite detector C5 is provided. A patient C7 is positioned on a patient couch C8 that can be displaced in the direction of the system axis C9, with which, during the scanning with the X-rays, the patient can be continuously or sequentially pushed along the system axis C9 through a measuring field between the X-ray tubes C2 and C4 and the respective assigned detectors C3 and C5. This process is controlled by a computing and control unit C10 with the aid of computer programs Prg1 to Prgn.

According to an embodiment of the invention, the detectors C3 and C5 are embodied as direct-converting X-ray detectors (see FIGS. 2 to 4) for the detection of X-rays according to the method according to the invention.

Figure 2:
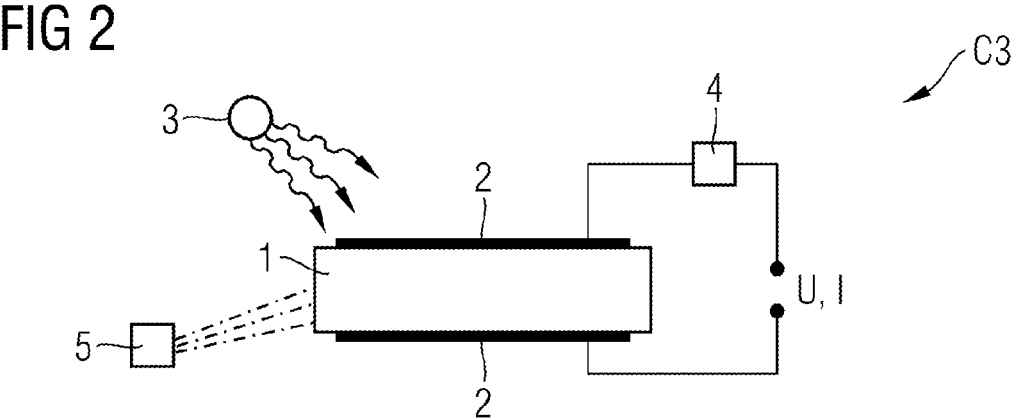
FIG. 2 a schematic representation of a X-ray detector in a first embodiment, FIG. 3 a schematic representation of the X-ray detector in another embodiment and FIG. 4 a schematic representation of the X-ray detector in a further embodiment.
Figure 3:
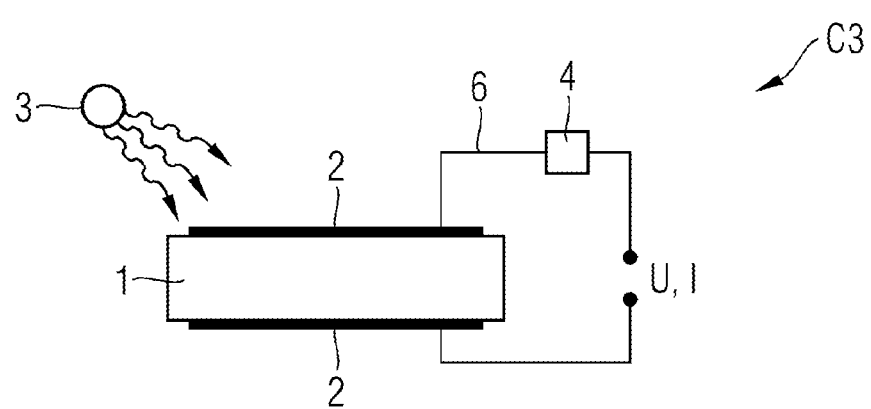
Figure 4:
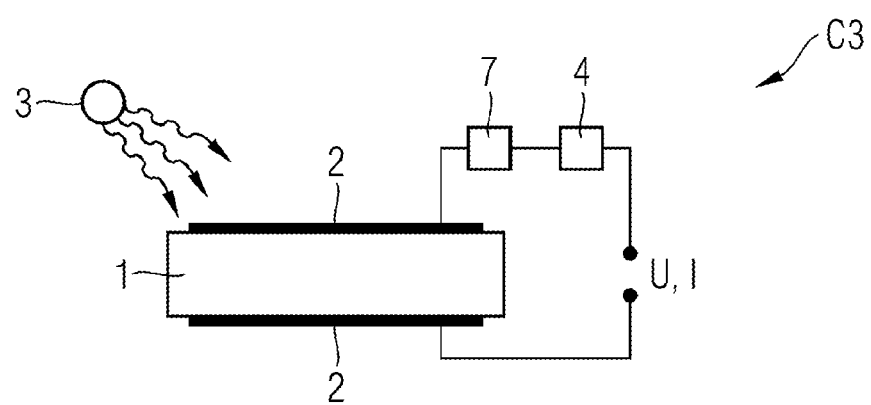

FIGS. 2 to 4 each show a schematic representation of an X-ray detector C3 in different embodiments, wherein, for purposes of clarity, only the components required to understand embodiments of the invention are shown. The X-ray detector C3 comprises a semiconductor 1, for example CdTe, which is part of a detector surface used for the detection the X-rays. The detector surface is divided into a plurality of partial detector surfaces. In the embodiments shown here, the semiconductor 1 exactly corresponds to a partial detector surface embodied as a pixel. Electrodes 2 are arranged on two opposite side surfaces of the semiconductor 1. A voltage U is applied to the semiconductor 1 via the electrodes 2.

The X-ray detector C3 also comprises an additional radiation source 3, which irradiates the semiconductor 1 with additional radiation, for example IR, UV or visible radiation. The irradiation of the semiconductor 1 with the additional radiation and the X-rays causes an electric power to be generated, which in turn generates heat in the semiconductor 1. A metering unit 4 is embodied to measure the X-ray pulses generated by the X-rays. This metering unit 4 contains, for example, one or more pulse-height discriminators to detect the X-ray pulses.

According to an embodiment of the invention, the X-ray detector C3 comprises a control loop for the energy regulation of the additional radiation, which keeps the temperature in the semiconductor 1 constant by keeping the electric power in the semiconductor 1 constant by way of a change to the power of the additional radiation. In the embodiments shown here, the control loop is integrated in the detector, in particular in the metering unit 4, and therefore not shown explicitly.

The method according to an embodiment of the invention is performed at least during heterogeneous and/or temporally variable irradiation of the detector surface with the X-rays. In order to determine the respectively necessary, power-adjusted changes to the power of the additional radiation, different reference variables are measured, in particular the temperature of the semiconductor 1 (see FIG. 2), the X-ray flux (see FIG. 3) and/or a current in the semiconductor (see FIG. 4).

According to the embodiment in FIG. 2, the X-ray detector C3 comprises a temperature metering unit 5 as a part of the control loop in order to measure the temperature of the semiconductor 1 as a reference variable and to adjust the power of the additional radiation to the measured temperature. The temperature metering unit 5 is embodied as an IR diode for contactless measurement of the surface temperature of the semiconductor 1.

In the embodiment in FIG. 3, the X-ray flux of the semiconductor 1 is measured as a reference variable. The measurement is performed in the metering unit 4 of the actual detector so that the X-ray flux measurements are derived from the detector measured values of the actual X-ray detector. To this end, the semiconductor 1 comprises an electric connection 6 to the metering unit 4, wherein the electric connection 6 is integrated in the connection of the semiconductor 1 to the metering unit 4.

With the embodiment shown in FIG. 4, the control loop comprises a current-metering unit 7, which measures the entire current I generated in the semiconductor 1. The current I is generated by the X-rays and the additional radiation. Correspondingly, the reference variable of the control loop is the measured current I.

Overall, therefore, an embodiment of the invention suggests a method for the temperature stabilization of a direct-converting X-ray detector, comprising a detector surface having a semiconductor and being divided into a plurality of partial detector surfaces, wherein during the irradiation of the detector surface, heat is generated in the semiconductor by electric power, wherein electric power generated in the semiconductor for each partial detector surface is kept constant at least during heterogeneous and/or temporally variable irradiation of the detector surface by feeding-in power-adjusted, additional radiation for each partial detector surface.

Also suggested is a direct-converting X-ray detector for the detection of X-rays according to an embodiment of the method according to the invention, wherein at least one control loop is embodied with at least one reference variable for the energy regulation of the additional radiation, which for each partial detector surface keeps the temperature in the semiconductor constant by keeping the electric power in the semiconductor constant by means of a change to the power of the additional radiation, and a CT system.

Although the invention was illustrated and described in more detail by means of the preferred exemplary embodiment, the invention is not restricted by the disclosed examples and other variations can be derived by the person skilled in the art without departing from the protective scope of the invention.

What is claimed is:

1. A method for the temperature stabilization of a direct-converting X-ray detector including a detector surface, the detector surface including a semiconductor and being divided into a plurality of partial detector surfaces, wherein during irradiation of the detector surface, heat is generated in the semiconductor by electric power, the method comprising:
keeping electric power generated in the semiconductor constant for each partial detector surface, at least during heterogeneous and/or temporally variable irradiation of the detector surface, by feeding-in power-adjusted radiation for each partial detector surface.

2. The method of claim 1, wherein the power adjustment of the radiation is performed as a function of a measured temperature of the partial detector surface.

3. The method of claim 2, wherein the temperature of the partial detector surface is measured by way of a contactless temperature measurement.

4. The method of claim 3, wherein the power adjustment of the radiation is performed as a function of an X-ray flux measured for each partial detector surface.

5. The method of claim 4, wherein the X-ray flux is derived from detector measured values of the X-ray detector itself.

6. The method of claim 2, wherein the method is for use in a CT system.

7. The method of claim 2, wherein the power adjustment of the radiation is performed as a function of an X-ray flux measured for each partial detector surface.

8. The method of claim 7, wherein the X-ray flux is derived from detector measured values of the X-ray detector itself.

9. The method of claim 1, wherein the power adjustment of the radiation is performed as a function of an X-ray flux measured for each partial detector surface.

10. The method of claim 9, wherein the X-ray flux is derived from detector measured values of the X-ray detector itself.

11. The method of claim 1, wherein the power adjustment of the radiation is performed as a function of a current measured in the semiconductor for each partial detector surface.

12. The method of claim 1, wherein the power adjustment of the radiation is performed by changing intensity of the radiation.

13. The method of claim 1, wherein the power adjustment of the radiation is performed by changing at least one of a pulse duration and a pulse spacing of the radiation.

14. The method of claim 1, wherein, the method includes feeding-in the radiation over a prespecified period and applying voltage to the semiconductor and afterwards measuring radiation absorption with the X-ray detector.

15. The method of claim 1, wherein predefined groups of detector elements are used as a partial detector surface.

16. The method of claim 1, wherein a detector element is used as a partial detector surface.

17. The method of claim 1, wherein a detector module is used as a partial detector surface.

18. A direct-converting X-ray detector for the detection of X-rays, comprising:
one detector surface used for the detection of X-rays, comprising a semiconductor and being divided into a plurality of partial detector surfaces, wherein, during irradiation of the detector surface, heat is generated in the semiconductor by electric power;
at least one radiation source for each partial detector surface, each configured to irradiate the semiconductor with radiation; and
at least one control loop with at least one reference variable, embodied for energy regulation of the radiation, to keep temperature in the semiconductor constant for each partial detector surface by keeping the electric power in the semiconductor constant by way of changing energy of the radiation.

19. The X-ray detector of claim 18, wherein, for each partial detector surface, the at least one control loop comprises at least one temperature metering unit for measuring the temperature of the semiconductor as a reference variable.

20. The X-ray detector of claim 18, wherein, for each partial detector surface, the at least one control loop includes a connection to a metering unit of the X-ray detector, wherein an X-ray flux measured in the respective partial detector surface is used as a reference variable.

21. The X-ray detector of claim 18 wherein, for each partial detector surface, the at least one control loop comprises at least one current-metering unit for measuring a current generated in the semiconductor as a reference variable.

22. The X-ray detector of claim 18, wherein the partial detector surface is embodied as predefined groups of detector elements.

23. The X-ray detector of claim 18, wherein the partial detector surface is embodied as a detector element.

24. The X-ray detector of claim 18, wherein the partial detector surface is embodied as a detector module.

25. The X-ray detector of claim 18, wherein the at least one radiation source is embodied as a light-emitting diode for the emission of electromagnetic radiation.

26. The X-ray detector of claim 18, wherein the at least one radiation source is embodied as an electron source.

27. A CT system, comprising:
at least an X-ray detector of claim 18.

* * * * *